Oct. 20, 1970  K. EICHWEBER ET AL  3,534,600
AIRCRAFT MEASURING DEVICE
Filed Nov. 19, 1968  2 Sheets-Sheet 1

INVENTORS
KURT EICHWEBER
PETER WAGENKNECHT
BY
Lane, Aitken, Dunner & Ziems
ATTORNEYS Oct. 20, 1970  K. EICHWEBER ET AL  3,534,600
AIRCRAFT MEASURING DEVICE
Filed Nov. 19, 1968                           2 Sheets-Sheet 2
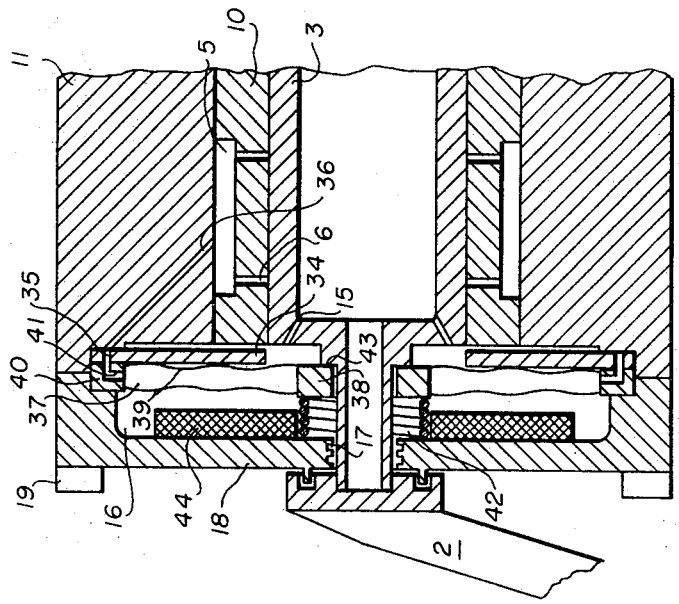
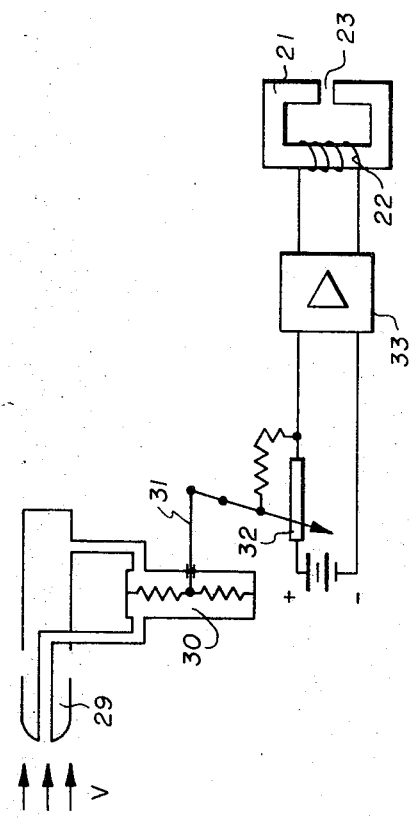
INVENTORS.
KURT EICHWEBER
PETER WAGENKNECHT
BY
ATTORNEYS

United States Patent Office 3,534,600
Patented Oct. 20, 1970

3,534,600
AIRCRAFT MEASURING DEVICE
Kurt Eichweber, Bondenwald 28, Hamburg-Niendorf, Germany, and Peter Wagenknecht, Swallenweg 29a, Hamburg-Schenefeld, Germany
Filed Nov. 19, 1968, Ser. No. 777,042
Claims priority, application Germany, Nov. 22, 1967, 1,623,526
Int. Cl. G01c 21/00
U.S. Cl. 73—180      10 Claims

ABSTRACT OF THE DISCLOSURE

A device for measuring the attack and sideslip angles of an aircraft and including a drag member connected to a shaft which is adapted to rotate in response to changes in the direction of the fluid stream adjacent an outer surface of the aircraft to generate an output signal. A low friction fluid bearing means is provided on the aircraft and is adapted to support the shaft for rotary movement.

Background of the invention

This invention relates to a measuring device for aircraft and, more particularly, to such a device for determining the angle of attack and the sideslip angle of an aircraft in flight.

An ever increasing importance is being attributed to the measurement of the above angles in modern flying techniques. For example, because of aerodynamic losses at very high speeds, wing profiles and airfoil designs are chosen which require a greater angle of attack to provide the necessary lift, especially at low speeds such as during an approach for a landing. Furthermore, as a result of some of these aerodynamic designs, the derivative of the pitch moment coefficient to the angle of attack becomes positive in higher ranges of the angle of attack and thus self-acting stalling occurs. In such cases, transducers must be fitted to the exterior of the aircraft which serve to operate devices for preventing such stalling, and it is apparent that these transducers must be highly reliable and accurate to insure, among other things, the safety of the aircraft.

Angle-of-attack and sideslip angle transducers are known in which an external drag profile is mounted on the aircraft and supported by a rotary shaft so that, under the influence of wind forces, it adjusts itself with its measuring plane in the wind direction to provide an output signal. It is also known to provide the supported shaft with mechanical damping, usually in the form of a hydraulic device, in order to avoid overshoots and too great a sensitivity to outer interferences. For mounting such systems, use is made of ball bearings which have a static and rolling friction coefficient which is highly dependent on external influences, such as temperature, vibrations, lubrication, etc. Furthermore, it is not possible to completely seal the ball bearings against the influence of moisture.

Also, in these known systems, the hydraulic damping is not strictly velocity dependent due to frictional influences, and can be optimized only for a definite range of the aircraft speed, which range constantly varies due to the temperature dependent viscosity of the particular fluid. Moreover, the inherent friction in the various components involved does not permit an accurate signal to be obtained at very low aircraft speeds.

Summary of the invention

Therefore, the object of the present invention is to provide a device for providing a highly reliable and precise measurement of the angle of attack and sideslip angle of all types of aircraft at all speeds, which measurement is independent of external environmental influences.

Briefly summarized, the device of the present invention comprises a drag member, a shaft operatively connected to said drag member and adapted to rotate in response to changes in drag forces on said drag member, fluid bearing means carried by said aircraft and adapted to support said shaft for rotary movement, and means responsive to rotary movement of said shaft for generating an output signal. Means may be provided to control the damping of the rotary movement in response to aircraft speed.

Brief description of the drawings

Reference is now made to the accompanying drawings for a better understanding of the nature and objects of the transducer of the present invention, which drawings illustrate the best mode presently contemplated for carrying out the objects of the invention and its principles, and are not to be construed as restrictions or limitations on its scope. In the drawings:

FIG. 2 is a diagrammatic view of the electrical circuit associated with the damping means of the device of the present invention; and FIG. 3 is a partial vertical sectional view, depicting an alternate embodiment of the device of the present invention.

Description of the preferred embodiments

Figure 1:
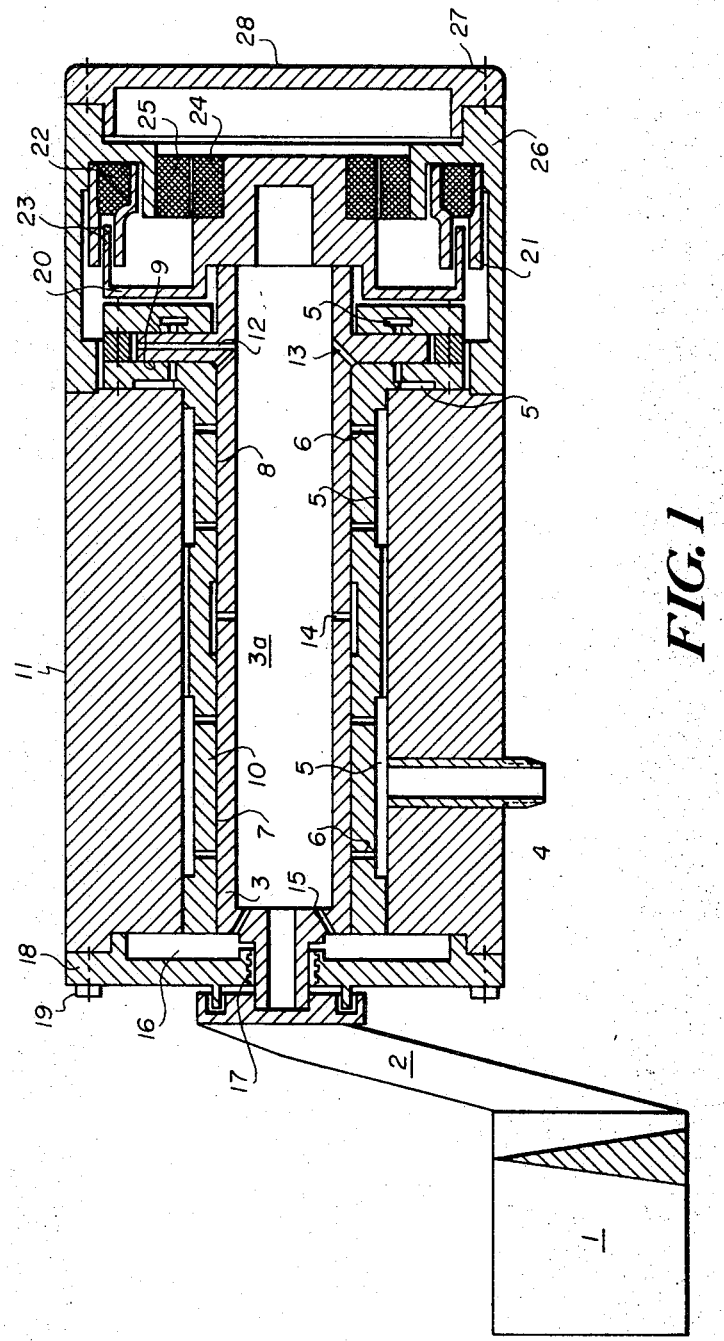
FIG. 1 is a vertical sectional view of the device of the present invention.

Referring specifically to FIG. 1, an external drag member 1 is connected, by means of a lever 2, to a bearing shaft 3. A fluid, such as gas, is adapted to pass under pressure from an external source, not shown, into a connection 4, from which it passes through a plurality of collecting channels 5 and orifices 6, formed in a sleeve 10 surrounding the shaft 3, into a space between the outer wall of the shaft 3 and the inner wall of the sleeve 10 to form two radial bearings 7 and 8. An axial bearing 9 is also formed between a flange formed on the shaft 3 and a corresponding portion of the sleeve 10. The sleeve 10 is enclosed in a housing 11 through which the connection 4 extends.

The exhaust gas passes from the bearings 7, 8, and 9 through bores 12, 13, and 14 into the shaft interior 3a, and from the latter, through a plurality of bores 15 into a sealing antechamber 16. From this antechamber, the gas passes into the atmosphere through a labyrinth 17, which thus provides a seal against penetrating dirt and moisture. The sealing antechamber 16 is formed by a housing cover 18 which is secured by means of screws 19 to the housing 11.

A bell-shaped member 20 is fixed to the rear end of the shaft 3 and preferably consists of an electrical conductive material. A plurality of iron cores 21 of a magnetic conducting material extend around the rim of the bell-shaped member 20, and each has a coil 22 provided in its central portion. Thus a high magnetic flux density is produced in the gap 23 between the cores 21 and the bell-shaped member 20, which, during rotation of the shaft 3 and the bell-shaped member 20 produces eddy currents in the bell-shaped member 20, and brakes or damps the rotary motion by counter torques.

A rotor 24 is also fixed to the rear end of the member 20 and forms a portion of a synchro mechanism, the stator 25 of which is fixed to a housing section 26, which, together with a sealing cover 28, is secured by means of screws 27 to the housing 11. Thus, upon rotation of the shaft 3 and the rotor 24 in response to variations in the aircraft angle of attack and/or sideslip angle as sensed by the drag member 1 responsive to the direction of the fluid stream adjacent an outer surface of the aircraft, an output signal is generated which may be detected in any known manner.

Means may be provided to control the above mentioned braking or damping in response to the aircraft speed. As shown in FIG. 2, a Pitot tube 29 is provided and is adapted to produce a dynamic pressure in response to the aircraft speed V, which pressure is transferred into a differential diaphragm mechanism 30. A lever system 31 is connected to the diaphragm mechanism 30 and is adapted to adjust a potentiometer 32 in response to the particular aircraft speed, the potentiometer having a winding designed according to the function of the optimum damping for the respective aerodynamic pressure. The potentiometer 32 is in series with a source of D.C. voltage as shown, and the intensity of the direct current controlled by the potentiometer 32 is amplified in an amplifier 33 and fed to the coil 22, thereby generating a magnetic flux in the gap 23 corresponding to the optimum damping coefficient.

The embodiment of FIG. 3 is basically similar to that of FIGS. 1 and 2, but employs means for sealing the bearing system upon shutting off the gas pressure. As shown, a disk 34 is affixed to the housing 11 and has a bore 35 which communicates, through a bore 36, with a collecting channel 5. A diaphragm capsule 37 engages the disk 34, is firmly held by means of the cover 18 and the screw 19, and consists of a sealing ring 38, two diaphragms 39, and an outer ring 40, the outer ring having a bore 41 which registers with the bore 35 of the disk 34. A coil spring 42, which is supported against the cover 18, presses against the sealing ring 38. Therefore, if bearing gas is fed under pressure into the collecting channels 5 so that the gas bearing portion 43 of the shaft 3 against the action of the spring 37 will cause the sealing ring 38 to be lifted off an offset becomes operative, the pressure in the diaphragm capsule 42, and thus clear the space for passage of the exhaust gas coming out of the bores 15.

Furthermore, a self-regulating filament winding 44 may be disposed in the antechamber 16, which winding has the function of vaporizing the moisture which has penetrated through the labyrinth 17 during shutdown, and causing it to flow out again through the labyrinth 17 together with the exhaust gas.

The advantages achieved by the present invention consist particularly in that the angle of attack and the sideslip angle can be measured over an aircraft speed range from a few knots to high Mach ranges due to the frictionlessness of the bearing. Also, by means of the controlled damping, an optimum oscillation characteristic is obtained. Moreover, by the combination of a positive flow seal in operation and metallic blocking during standstill, in connection with a heating means in the sealing space, the bearing system is safely sealed against corroding and interfering influences from the atmosphere.

Of course, variations of the specific construction and arrangement of the measuring device disclosed above can be made by those skilled in the art without departing from the invention as defined in the appended claims.

What is claimed is:

1. A device for measuring the attack and sideslip angles of an aircraft, comprising a drag member responsive to the direction of the fluid stream adjacent an outer surface of the aircraft, a shaft operatively connected to said drag member and adapted to rotate in response to movements of said drag member, fluid bearing means carried by said aircraft and adapted to support said shaft for rotary movement, and means responsive to the rotray movement of said shaft for generating an output signal.

2. The device of claim 1 further comprising means responsive to aircraft speed for controlling a means for damping said rotary movement.

3. The device of claim 1 wherein said bearing means comprises a sleeve extending around said shaft in spaced relation thereto, means to distribute pressurized fluid into the space between said shaft and said sleeve, and means to provide a continuous flow of said fluid into and from said space.

4. The device of claim 2 wherein said bearing means comprises a sleeve extending around said shaft in spaced relation thereto, means to distribute pressurized fluid into the space between said shaft and said sleeve, and means to provide a continuous flow of said fluid into and from said space.

5. The device of claim 3 further comprising sealing means adapted to seal said fluid bearing means from the atmosphere upon the shutting off of said flow of fluid.

6. The device of claim 4 further comprising sealing means adapted to seal said fluid bearing means from the atmosphere upon the shutting off of said flow of fluid.

7. The device of claim 1 further comprising a sealing antechamber disposed adjacent said fluid bearings means, and a self-regulating heating means disposed in said antechamber and adapted to vaporize moisture penetrating into said antechamber.

8. The device of claim 2 further comprising a sealing antechamber disposed adjacent said fluid bearings means, and a self-regulating heating means disposed in said antechamber and adapted to vaporize moisture penetrating into said antechamber.

9. The device of claim 1 wherein said fluid is in the form of pressurized gas.

10. A device for measuring the attack and sideslip angle of an aircraft, comprising a drag member responsive to the direction of the fluid stream adjacent an outer surface of the aircraft, a shaft operatively connected to said drag member and adapted to rotate in response to movements of said drag member, bearing means carried by said aircraft and adapted to support said shaft for rotary movement, means responsive to the rotary movement of said shaft for generating an output signal, and means responsive to aircraft speed for controlling a means for damping said rotary movement.

References Cited

UNITED STATES PATENTS 2,918,817  12/1959  Hughes et al. _____ 73—180
3,105,382  10/1963  Friedman et al. _____ 73—180

DONALD D. WOODIEL, Primary Examiner